UNITED STATES PATENT OFFICE.

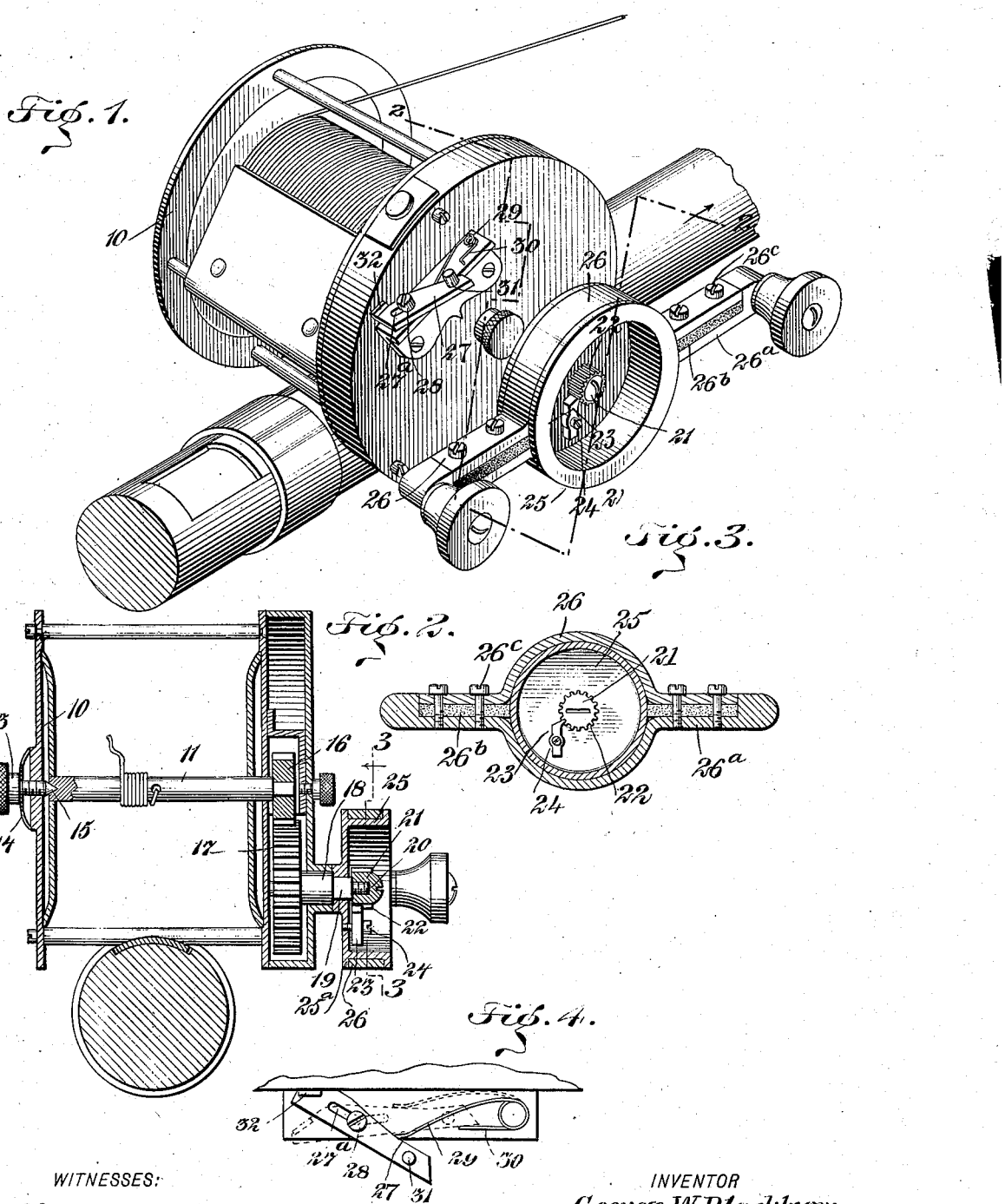

GEORGE WASHINGTON BLACKBURN, OF SARASOTA, FLORIDA.

FISHING-REEL.

No. 847,890.　　　Specification of Letters Patent.　　　Patented March 19, 1907.

Application filed October 16, 1905. Serial No. 282,983.

*To all whom it may concern:*

Be it known that I, GEORGE WASHINGTON BLACKBURN, a citizen of the United States, and a resident of Sarasota, in the county of Manatee and State of Florida, have invented a new and Improved Fishing-Reel, of which the following is a full, clear, and exact description.

My invention relates to certain attachments for fishing-reels; and the principal objects thereof are to provide fishing-reels with an improved friction-drag, with an automatic stop, with means for setting the drag for any desired pull, with a locking device to prevent the nut of the reel-post from working loose, and with other advantageous features without using any screws on the face of the device to injure the hands or any washers to wear out or clog.

Reference is to be had to the accompanying drawings, forming a part of this specification, in which similar characters of reference indicate corresponding parts in all the figures.

Figure 1 is a perspective view of a reel, showing the principle of my invention. Fig. 2 is a sectional view of the same on the line 2 2 of Fig. 1. Fig. 3 is a sectional view on the line 3 3 of Fig. 2, and Fig. 4 is a fragmentary view of an automatic stop constituting a part of my invention.

I have shown my invention as applied to a reel having a frame 10 and a main shaft 11 of the usual construction. In this type of reel the shaft 11 is mounted on the frame at one end by means of a screw 13, having a spring-washer 14 between it and the frame, the screw being provided with a sharpened end 15, entering the end of the shaft. The shaft is also provided with a pinion 16, meshing with a gear 17 on a gear-post 18.

In my improvement the gear-post is provided with an angular end 19, upon which is mounted a screw-threaded shank 20. On this shank is screwed a nut 21, having teeth 22. A pawl 23 is pivotally mounted upon a stud 24 and is adapted to engage the teeth, so as to hold the nut and prevent its being removed from the gear-post when the pawl is in operative position. The stud 24 is located on a spool 25, mounted on the angular portion of the reel-post and adapted to turn therewith. The spool has a circumferential groove 25$^a$ for receiving a split band 26. The two parts of this band have projections 26$^a$, the parts 26 and 26$^a$ constituting a handle.

These projections are separated from each other and have felt 26$^b$ between them to keep sand and dirt from the drag formed by the spool and band. The tension of the drag can be adjusted by screws 26$^c$.

On the frame is a pawl 27, which is adapted to be engaged by the handle as it rotates. This pawl is provided with an elongated slot 27$^a$, through which passes a stud 28, secured to the frame. The pawl is operated upon by a spring 29, having an extension 30, under which the end of the pawl is adapted to engage to hold the pawl in inoperative position. This is accomplished by forcing the pawl forwardly a sufficient distance to engage its nose under the portion 30 of the spring. This is allowed by the length of the slot 27$^a$. The pawl is provided with a projection 31, by means of which it can be manipulated, and with a projection 32, adapted to engage the surface of the frame and stop its motion in one direction.

It will be observed that the rotation of the handle in one direction will be perfectly free, as the handle will engage the end of the pawl and force it down whenever the handle comes in contact with the pawl; but in the other direction the handle will be absolutely stopped by coming against the flat surface of the forward end of the pawl. If a fish is on the line, its running will turn the spool in opposition to the brake or drag put upon it by the band 26, which is held in stationary position. When it is desired to allow the reel to unwind without drag, the pawl can be put into the position shown in dotted lines in Fig. 4 and the rotation of the handle will not be interfered with.

Having thus described my invention, I claim as new and desire to secure by Letters Patent—

1. A friction-reel carrying a main shaft, a rotatable handle connected with the shaft, and an automatic stop for the handle, said stop comprising a pivoted pawl adapted to project into the path of the handle.

2. A fishing-reel having a rotatable handle, and a stop therefor, said stop comprising a pivoted pawl adapted to project into the path of the handle, the pawl being provided with means for preventing its motion about its pivot in one direction beyond a certain point, and also provided with a spring for permitting the pawl to be depressed in the other direction.

3. A stop for a fishing-reel, comprising a pawl having an elongated slot, a stud passing through said slot for pivoting the pawl, a projection below said slot for limiting the motion of the pawl, and a spring for forcing the pawl into a position in which said projection is in limiting position.

4. An automatic stop for a fishing-reel, comprising a pawl having an elongated slot, a stud passing through said slot on which the pawl is pivoted, a spring for forcing the pawl in one direction, and a stud for limiting the motion of the pawl in that direction.

5. A stop for a fishing-reel, comprising a pawl mounted to move about a pivot and to move longitudinally.

6. A stop for a fishing-reel, comprising a pawl, resilient means for forcing the pawl into operative position, and means for engaging the pawl and holding it in inoperative position.

7. A stop for a fishing-reel, comprising a swinging and longitudinally-movable pawl, and a spring for forcing the pawl into operative position; said spring having means for engaging the pawl and holding it in inoperative position.

8. A fishing-reel having a drag, comprising a spool, a handle rotatably mounted on the spool, and a stop for the handle, comprising a spring-pawl adapted to engage and hold the handle when the handle turns in one direction.

9. A fishing-reel having a drag comprising a spool, a two-part handle, each part of the handle having a semicircular portion embracing one side of the spool and a projection, the projection of one part entering that of the other, a fibrous packing between said parts engaging the spool, and means for varying the distance between the parts of the handle to vary the friction on the spool.

10. A fishing-reel having a drag, comprising a spool, a handle adapted to be held on the spool by friction, and a fibrous packing between the handle and spool, for preventing the entrance of dirt and dust between them.

In testimony whereof I have signed my name to this specification in the presence of two subscribing witnesses.

GEORGE WASHINGTON BLACKBURN.

Witnesses:
C. V. S. WILSON,
E. J. MESSER.